US006272856B1

(12) United States Patent
Foppe

(10) Patent No.: US 6,272,856 B1
(45) Date of Patent: Aug. 14, 2001

(54) METHOD FOR STORING ENERGY IN THE FORM OF THERMAL ENERGY BY MEANS OF HIGH-TEMPERATURE ACCUMULATORS

(76) Inventor: Werner Foppe, Hünshovener Gracht 13, D-52511 Geilenkirchen (DE)

( * ) Notice: Subject to any disclaimer, the term of this patent is extended or adjusted under 35 U.S.C. 154(b) by 0 days.

(21) Appl. No.: 09/582,867

(22) PCT Filed: Aug. 10, 1998

(86) PCT No.: PCT/DE98/02293

§ 371 Date: Jul. 3, 2000

§ 102(e) Date: Jul. 3, 2000

(87) PCT Pub. No.: WO99/07804

PCT Pub. Date: Feb. 18, 1999

(30) Foreign Application Priority Data

Aug. 11, 1997 (DE) .............................. 197 34 733

(51) Int. Cl.⁷ ............................. F01B 29/10; F01K 15/00
(52) U.S. Cl. ................................ 60/517; 60/659; 60/668
(58) Field of Search .................................. 60/691.8, 517, 60/693, 650, 659, 668

(56) References Cited

U.S. PATENT DOCUMENTS

| 4,512,388 | 4/1985 | Claar et al. ............................... 165/1 |
| 5,335,497 | * 8/1994 | Macomber ..................... 60/641.8 X |
| 5,775,107 | * 7/1998 | Sparkman ........................... 60/641.8 |
| 5,899,071 | * 5/1999 | Stone et al. ......................... 60/641.8 |
| 6,000,211 | * 12/1999 | Bellac et al. .................... 60/641.8 X |

FOREIGN PATENT DOCUMENTS

| 44 27 322 | 2/1996 | (DE) . |
| 4427322 | 2/1996 | (DE) . |
| 44 45 160 | 6/1996 | (DE) . |
| 445160 | 6/1996 | (DE) . |
| 0665413 | 1/1995 | (EP) . |
| 0 665 413 | 8/1995 | (EP) . |
| 0 770 511 | 5/1997 | (EP) . |
| 0770511 | 5/1997 | (EP) . |
| 95/25916 | 9/1995 | (WO) . |
| WO 95/25416 | 9/1995 | (WO) . |

OTHER PUBLICATIONS

Consumer Energy Information EREC Reference Briefs (Materials reviewed in 1997).

* cited by examiner

*Primary Examiner*—Hoang Nguyen
(74) *Attorney, Agent, or Firm*—Herbert Dubno

(57) ABSTRACT

The invention relates to a method for actuating nonsystem-connected vehicles by means of high-temperature accumulators and for the operation of stationary energy storage using material with high evaporation enthalpy as storage media for high-temperature heat. Said high-temperature heat is generated by means of current transfer and can be stored for a sufficient length of time by means of super isolation and high-temperature resistant carbon materials. On demand, the stored high-temperature heat can be converted directly into electric operating energy, specifically pressure energy, for actuating hydraulic motors by means of a thermionic generator or a Stirling motor. The average capacity of high-temperature accumulators is 10 kWh/kg greater than that of internal-combustion machines and is 100 times greater than the present highest capacity electrochemical working accumulators, thus enabling the operation of all fuel operated vehicles to be more comfortable, more affordable and cleaner in the future due to high-temperature accumulators.

22 Claims, No Drawings

METHOD FOR STORING ENERGY IN THE FORM OF THERMAL ENERGY BY MEANS OF HIGH-TEMPERATURE ACCUMULATORS

The invention relates to a method in which thermal energy is stored in rapidly chargeable high temperature accumulators which can be converted directly via a thermionic generator into electrical drive energy or via a Sterling engine directly into pressure energy for the driving of hydraulic motors.

High temperature accumulators which operate on an electrochemical basis are known like the sodium/sulphur high temperature system of ABB which has the highest output at the present time with 0.08–0.1 kWh/kg and the sodium/nickel chloride high temperature system of AEG Anglo Batteries, under the product name 'Zebra Battery' with 0.08 kWh/kg.

These so-called high temperature systems require operating temperatures of about 300° C. at which the oxide ceramic electrolyte is conductive to ions and permits the electrode reactions resulting from the current supplied. To maintain the operating temperature continuous heating is required, otherwise the accumulator fails and discharges within a few days.

Apart from the danger of accidents, the high cost, the high weight, the low operational range and the high charge times are negative factors which make these systems non-competitive with internal combustion engines. The Zebra Battery which is ripe for reproduction, is still 500 DM/kWh even when produced in quantity and at drive powers like those of a gasoline engine with a storage capacity of 50 kWh, can have a weight of 600 kg and an accumulator cost of 25,000 German marks.

A significant problem with such systems is the reactive and corrosive melts which can, in the case of a serious accident, ignite upon contact with water and air. Liquid sodium reacts explosively in combination with water. The alkali sulfur melt is highly corrosive to steel and causes breakdown of the battery housing even in the case of hairline cracks and ignites upper contact with air.

In combination with water highly poisonous hydrogen sulfide can result. For these reasons, ABB has limited work on the sodium/sulfur battery.

By contrast with these electrochemically operating high temperature accumulators which by comparison with the method of the invention can be considered low temperature accumulators, the high temperature accumulator system of the invention operates with a many times higher temperature which, depending upon the respective accumulator material used, can be higher by a factor of 10.

The object of the high temperature accumulator process according to the invention is to operate vehicles of all kinds, whether land vehicles, water vehicles, air vehicles or space vehicles, independent from electrical networks in as comfortable a manner or more comfortably than with internal combustion engines without the drawbacks of the latter, like release of toxic materials, high noise level and high maintenance requirements. A further object is the provision of an immediately available stationary energy store independent of power networks.

These objects are attained in that the highest possible quantity of heat per unit weight or unit space is stored in a fuel free manner in a high temperature accumulator according to the invention, is conserved over the longest time possible and upon demand is discharged again with the highest possible efficiency as drive energy.

The basic material for attaining the objects is graphite which serves as the carrier, storage pressure retentive, reinforcing and high temperature insulating material and is used simultaneously also for heat and current conduction and for resistance heating. Carbon is the material with the highest temperature resistance of about 3500° C. in the solid phase, is not wetted by molten metal and is thus used as a carrier material and as a material for heating up the high temperature accumulator but also as the heat storage material itself and is thus optimal for the high temperature accumulator.

Carbon can be worked and shaped as required. Carbon is a high capacity product as to its properties like thermal conductivity, electrical conductivity, density, compressive strength and tensile strength and can be produced with accurate dimensions in production processes. The product palette in carbon ranges from large blocks through fibers to composite materials, foils and insulating felts. From this availability of products alone it is possible to produce a carbon accumulator with a maximum capacity of 25 kWh/l.

The method according to the invention, uses apart from graphite as a storage material in this sense, other elements which have greater capacities or compounds of elements with higher melting and evaporation enthalpies and utilizes the fact that between the melting point and evaporation point a four times higher energy quantity can be taken up and stored than is necessary for the heating up of the material to a melting point. By evaporation of the storage material, a ten times greater energy quantity can thus be taken up whereby an optimum energy quantity per kWh/kg is storable therewith in the high temperature accumulator high pressure process which can optimally lie at 20 kWh/kg or 50 kWh/l.

Advantageously, nontoxic high temperature storage materials which sublime and directly pass from the solid into the gaseous state. Thus in the case of an accident, no melt is provided that run out, can cause fire or can trigger toxic reactions. Of significance also are the thermal conductivity and the electrical resistance which ensure a rapid transition from electric current to high temperature heat.

With respect to the properties of the high temperature storage materials and the temperature levels which are used the high temperature accumulators of the invention can be divided into high pressure units and low pressure units whereby the state of aggregation of the storage materials can be solid, liquid, gaseous, solid-liquid, liquid-gaseous and solid-gaseous.

For the storage of the high temperature heat the invention utilizes the fact that the efficiency of a thermionic generator or a Sterling engine increases with increasing temperature difference between the cold and hot regions. In this manner energy losses in the transmission from stored thermal energy to drive energy are held small. By comparison with an internal combustion engine which operates only with a fuel efficiency of 15%, thermoelectric generators and sterling engines operate with an efficiency in excess of 50% with high temperature heat and cooling to ambient temperature.

The overall efficiency and the cost/use balance by comparison to transport systems with internal combustion engines is increased further by the direct drive via current or hydraulic motors since the old high cost and weight intensive mechanical systems of conventional vehicles, like internal combustion engines exhaust systems, transmissions, universal joint shafts, starters, starting batteries, brake systems, fuel pumps, tanks and the maintenance and replacement thereof are eliminated. Motor oils, transmission oils, fuel and coolants are superfluous.

The storage material of the high temperature accumulators according to the invention comprise, apart from graphite, preferably elements from the groups of beryllium, boron, lithium, silicon and their borides, carbides and nitrides, most of which sublimate advantageously without a liquid phase. For use in a liquid phase, metals are also suitable as high temperature storage materials like, for example copper or vanadium at temperature ranges up to 3500° C. The energy densities of the aforedescribed high temperature storage material lie between 10 and 50 kWh/l which may be higher by a factor of 100 than the highest capacity electrochemically operating high temperature accumulators.

From the point of view of volume the storage of $Be_2C$ and $B_4C$ can be 35 kWh/liter at about 2500° C.

The energy used for heating up the storage material with electric current is converted in the transition from the liquid state into the solid state or from the gaseous into the solid state of aggregation again and is again fully available and can be transformed by generators to drive energy.

Advantageously, the charging with electric current is carried out by passing the current directly through the storage material and thus producing the high temperature heat by means of internal resistance heating. For an external heating of the storage material which is permissible by inductive heating, a removal or exchange of the storage material is required by an automated apparatus. The maintenance of the high temperatures for high temperature storage durations is ensured by a super insulation which is achieved in accordance with the invention by introducing the storage material under a protective gas (nitrogen, argon) into a pressure-tight and gas-tight hollow graphite cylinder (hollow graphite body) and directly heating it by current flow and/or indirectly heating it by thermal radiation from the graphite cylinder heated up by the electric current flow therethrough. The graphite cylinder, in the high pressure process must be able to retain the increased gas pressure of the sublimated storage material. To ensure this, either storage materials are selected with a reduced gas pressure at the sublimation point or the graphite cylinder is reinforced with carbon graphite fibers to retain the higher pressures.

For optimum thermal insulation, the graphite hollow body (carrier of the high temperature storage material) can be insulated by alternating graphite hard felt layers of reduced thermal conductivity and made gas tight and protective gas layers, whereby the inner graphite surfaces are provided with radiation reflectors.

A 40 mm thick SIGRATHERM hard felt layer forms a barrier under protective gas with a heat source of 2000° C. to thermal radiation of 10 kW/m² to limit the temperature on the opposite side thereof to 400° C. The thermal conductivity of the hard felt layer at 2000° C. amounted to about 1 W/K m and falls at 400° C. to 0.2 W/K m. At these temperatures, inexpensive rockwool felts with a thermal conductivity of a factor of ten less can be used for insulation. After insulation to ambient temperature the high temperature accumulator can be provided with a stable gas-tight shell which can be equipped with devices for automated energy takeup and energy discharge.

To insulate a hot cylinder of a diameter of 250 mm at a temperature of 2500° C. to room temperature, only one insulation layer sequence of the aforedescribed construction with a thickness of only about 250 mm is required. It thus is apparent how high energy capacities can be taken up with high temperature accumulators in small spaces.

An example of a low pressure high temperature accumulator according to the invention utilizes BN (boron nitride) which sublimates as a storage material at 2400° C. and has an average heat storage capacity makes this clear.

A cylinder of carbon with dimensions of 30×30 cm and a volumetric capacity of about 20 l stores an energy quantity of about 100 kWh at 3000° C. If one calculates a thermal insulation also with a layer thickness of about 30 cm, the carbon high temperature accumulator including its gas tight outer shell will have overall dimensions of about 100×100 cm at 100 kg total weight. A high temperature accumulator of these dimensions plus a generator, installed in the Sero-Emission-Car requires only the space occupied by the superfluous internal combustion engine with its drive systems or can be provided in a flatter form in the bottom plate. The zero emission auto then only requires an electronic control, four wheel-drive motors which can be used as generators upon braking and can feed the brake energy in the form of thermal energy again into the high-temperature accumulator or in the case of hydraulic motors can charge a pressure accumulator.

With an efficiency of 40 to 50% and a 100 kWh storage capacity, a zero emission automobile can travel with a high temperature accumulator 500 to 600 km with a charging time of five minutes. At current costs, even with present day expensive household current of 0.25 German Mark/kWh, 500 km of travel with the high temperature accumulator costs only about 25 German Marks, five times less than the fuel cost of a present day midsize automobile. With the aforementioned superinsulation, a stand time of five months can be expected before the high temperature accumulator is depleted as a result of heat loss. The life of an optimized high temperature accumulator of the invention with the capacity of 100 kWh/10 l with a total weight of 100 kg is equal to the life of the vehicle.

The object of the high temperature accumulators according to the invention to replace internal combustion engines for land vehicles, air vehicles and water vehicles and to provide emission free transport in all regions of the transport sector free from breakdown, is ensured with the given features of the high temperature accumulators.

| Power profile of an average high temperature accumulator. | |
|---|---|
| Power/height = | 100 kWh/100 kg |
| Power/cost = | 1 kWh/50 German Marks |
| High temperature accumulator cost = | 5000 German Marks |
| Range = | 500 km |
| Life = | 25 years |
| Charging time = | 5 minutes |
| Current cost/km = | .05 Mark/km |
| Current cost = | 5 Mark/100 km |

What is claimed is:

1. A high temperature accumulator for the storage of high temperature thermal energy, comprising:
   a hollow graphite body provided with a means for heating contents thereof; and
   a heatable high temperature storage material received in said graphite body and convertible by heating from one physical state to another.

2. The high temperature accumulator defined in claim 1 wherein said material includes a material selected from the group which consists of graphite, beryllium, boron, lithium, silicon and the borides, carbides and nitrides thereof.

3. The high temperature accumulator defined in claim 1 wherein said material includes a metal selected from the group which consists of copper and vanadium.

4. The high temperature accumulator defined in claim 1 wherein said material is in the form of a solid or liquid and is transformable by heating into a liquid or gas.

5. The high temperature accumulator defined in claim 1 wherein said material is stored in said body under a protective gas.

6. The high temperature accumulator defined in claim 1 wherein said means for heating includes means for passing an electric current directly through said body or through said material.

7. The high temperature accumulator defined in claim 1 wherein said material is transformable by heating from a solid phase to a gas phase by sublimation without passing through a liquid phase.

8. The high temperature accumulator defined in claim 1 wherein said material has a high vaporization enthalpy.

9. The high temperature accumulator defined in claim 1 wherein said body is a graphite body reinforced with carbon fiber fabric.

10. The high temperature accumulator defined in claim 1, further comprising layers of graphite felt alternating with protective gas layers surrounding said body and insulating same said graphite felt layers having inwardly facing surfaces with reflective coatings.

11. The high temperature accumulator defined in claim 1, further comprising a gas tight shell surrounding said body and provided with devices for automated energy reception and discharge.

12. The high temperature accumulator defined in claim 1 wherein the energy capacity of said material is 10 to 50 kWh per liter.

13. The high temperature accumulator defined in claim 1 wherein said material consists at least in part of graphite and said accumulator is provided with thermal insulation, pressurization material and electric current insulation all of graphite.

14. The high temperature accumulator defined in claim 1, further comprising a generator for recovering thermal energy from the accumulator.

15. The high temperature accumulator defined in claim 14 wherein said generator is a thermionic generator or a Sterling engine.

16. The high temperature accumulator defined in claim 1 wherein said accumulator is configured as an energy source for a vehicle.

17. The high temperature accumulator defined in claim 1 wherein said accumulator is configured as a stationary heat and current supplying unit.

18. A method of storing and regenerating energy which comprises:
providing a high temperature accumulator which comprises
a hollow graphite body provided with a means for heating contents thereof and a heatable high temperature storage material received in said graphite body and convertible by heating from one physical state to another;
supplying thermal energy to said material to change a state thereof at least in part; and
recovering energy from said material by driving a generator with energy therefrom.

19. The method defined in claim 18 wherein said material in said accumulator is heated by passing an electric current through said material directly or through said body.

20. The method defined in claim 18 wherein said material is heated inductively upon removal from said body.

21. The method defined in claim 18 wherein said material is heated to an evaporation point thereof in a low pressure mode of operation of said accumulator.

22. The method defined in claim 18 wherein said material is heated to a temperature in excess of its vaporization point in a high temperature mode of operation of said accumulator.

* * * * *